Jan. 18, 1938. H. W. GREIDER ET AL 2,105,531
METHOD OF MAKING BITUMINIZED WEB MATERIALS
Filed July 20, 1933 2 Sheets-Sheet 1
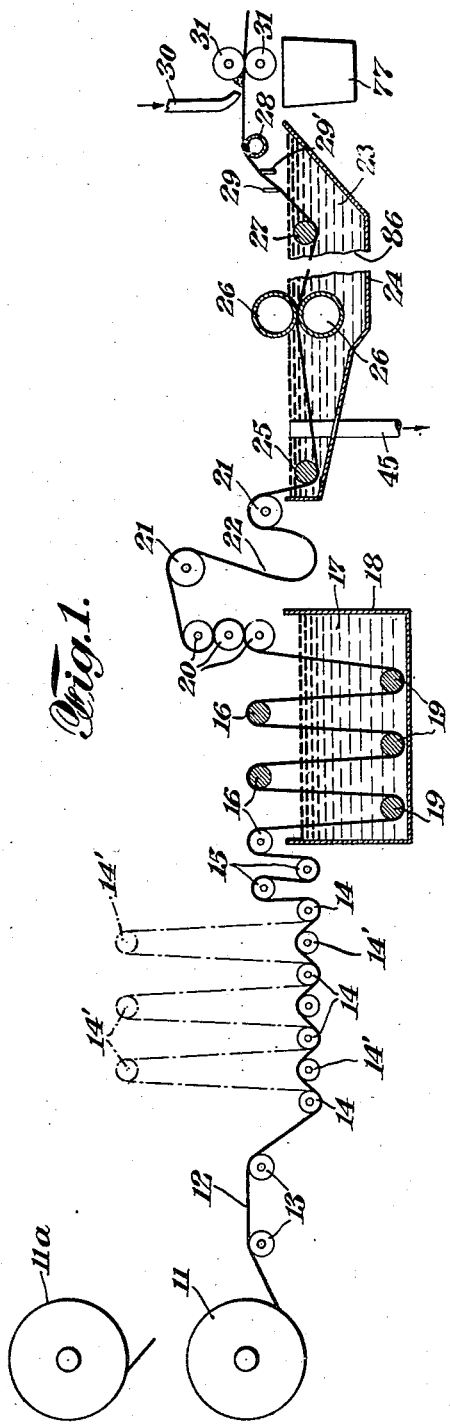
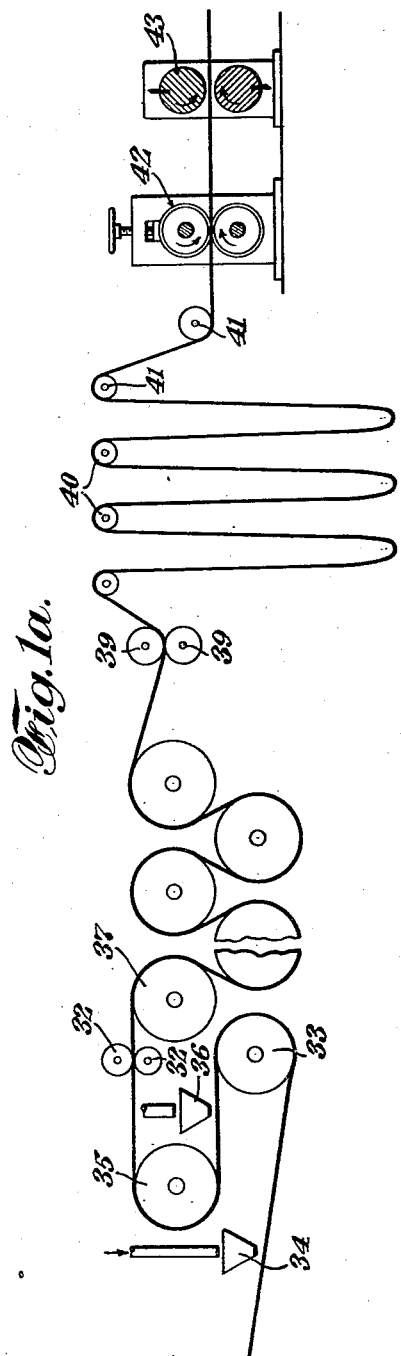
INVENTORS.
Harold W. Greider
George Arthur Fasola
BY
Kenyon & Kenyon
ATTORNEYS.

Jan. 18, 1938.                H. W. GREIDER ET AL                2,105,531
                    METHOD OF MAKING BITUMINIZED WEB MATERIALS
                          Filed July 20, 1933        2 Sheets-Sheet 2
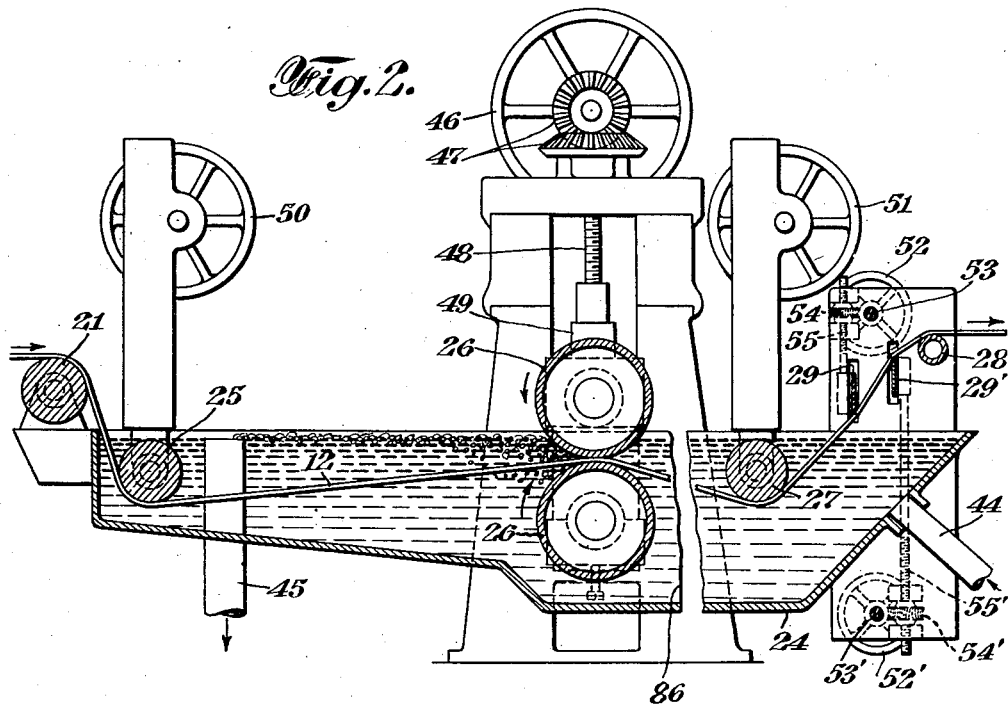
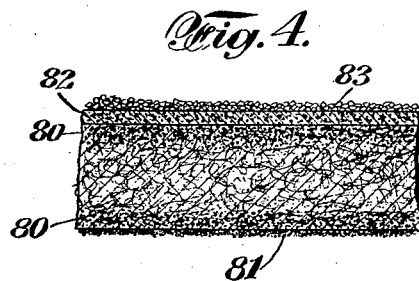
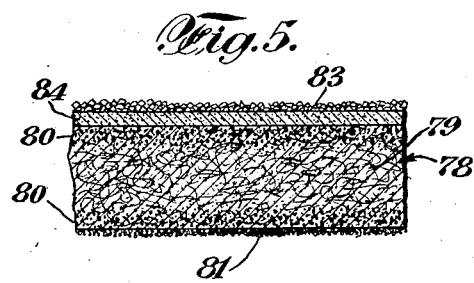
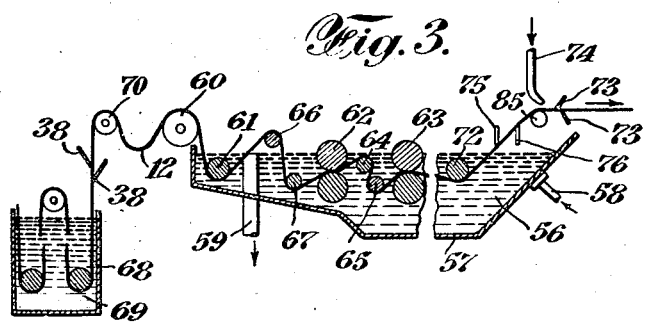
INVENTORS
Harold H. Greider
George Arthur Fasold
BY
Kenyon Kenyon
ATTORNEYS Patented Jan. 18, 1938

2,105,531

UNITED STATES PATENT OFFICE 2,105,531

METHOD OF MAKING BITUMINIZED WEB MATERIALS

Harold W. Greider, Wyoming, and George Arthur Fasold, Cincinnati, Ohio, assignors to The Philip Carey Manufacturing Company, a corporation of Ohio Application July 20, 1933, Serial No. 681,286

10 Claims. (Cl. 91—70)

This invention relates to method of making bituminized web material and particularly, for example, to impregnating and coating web material such as felt with bituminous saturants so as to afford building materials useful for purposes such as weather resisting coverings,—e. g., roofing, sidings and the like. For convenience in description such building materials whether used for roofings or for other purposes, will be referred to herein as "roofing". The roofing may be sold in roll form or may be cut into articles such as shingles, or shingle or siding strips of any suitable shapes and dimensions, or may be applied as "built-up" roofing with alternate layers of saturated felt and bonding asphalt.

A serious difficulty encountered in bituminized felt roofing as heretofore made has been the tendency of much roofing to "blister" and "slide". Upon exposure to hot weather a multiplicity of bubbles or blisters about 1/8 inch to about 3/4 inch in diameter often form in such roofing and push up the surface of the roofing and expose the felt base to the weather. The felt being unprotected at the blister points deteriorates rapidly. Moreover, a blistered roofing, particularly when the blisters are broken, is very unsightly as well as of low resistance to weathering.

Sliding results from the tendency of the surface coating or bitumen and granular solid adhering material to move or slip with respect to the felt base when exposed to summer heat. Sliding, of course, is particularly serious on inclined roofs or vertical walls. Frequently shingles of ordinary size exhibits 3/4 of an inch or more of slide after having been in place for some time.

It is a purpose of this invention to afford a method of making a roofing which is substantially non-blistering and non-sliding and to afford a method of making such roofing which is economical in operation.

Experiments with different types of bituminous saturants and coatings and with different webs have shown that the methods of impregnating and coating webs heretofore practiced have invariably resulted in including in the impregnated web a considerable amount of voids. Further experiments have shown that roofing, e. g., shingles, as heretofore made tends to absorb moisture either by direct application of water or by contact with moist air. This has been found to be due chiefly to porosity of the felt but also in part to the porosity of the pulverulent or granular material adherent to the coated web either through or along the sides of the particles which affords communication with internal minute air pockets or voids. Tests have shown that roofings heretofore made when soaked in water for one hour at 125°% F. will absorb as much as 10% to 20% of water or will absorb from 10% to 30% water in 24 hours at 77° F. Further tests have shown that such porous moisture laden roofing when exposed to summer weather becomes badly blistered.

A feature of this invention comprises impregnating web material with a saturant as by immersing the web in a saturating bath, removing excess saturant as by doctor blades or squeeze rolls and then passing the impregnated sheet between squeeze rolls while the web is immersed in a bath of coating material. Preferably the pressure of the squeeze rolls on the web immersed in the bath of coating material is greater than the pressure applied to remove the excess saturant at the conclusion of the saturating bath. Removal of the excess saturant by doctor blades is considered preferable. The squeeze rolls compress the web while the web is immersed in coating material so as to press out any air that may have been sucked into the web by cooling and contracting of the saturant in the web in passing the web to the coater. The pressure on the web being relieved while the web is immersed in the coating material, the expelled air is replaced by bituminous coating material drawn into the web. After leaving the squeeze rolls the web is preferably kept immersed in the hot coating until the web has expanded in thickness to substantially its original thickness.

The foregoing treatment is important in producing a non-blistering, non-sliding, and long weathering article. The preliminary saturation fills the web with a bituminous saturant and conditions it for the squeezing treatment and subsequent application of bituminous coating material so that substantially complete elimination of voids is attained. The compression of the web between squeezing members as by progressively squeezing the web between squeeze rolls when the web is submerged in the coating material, forces out substantially all entrapped air vapor or other gases and as the web expands it sucks in the coating material in contact therewith and seals the web in a substantially completely filled state. While the entrapped air is pressed out substantially completely a substantial portion of the bituminous saturating material (which has a lower softening point than the coating material) is retained at the interior or core of the web. This is important inasmuch as a soft flexible core is afforded which prevents cracking of the web in cold weather and delays drying out and hardening of the web as a result of weathering and increases the toughness and length of life of the roofing. Even more important, however, is the fact that blistering is avoided by the reduction in the void content due to the extremely high degree of devoiding that can be attained in the manner aforesaid. By the foregoing method the void content of the web can be reduced to .5% and less as determined by soaking the web in water at 77° F. for 24 hours. While such complete devoiding is attainable and desirable, blistering can be substantially reduced as compared with prior art roofings by decreasing the void content below about 2%. Moreover, the surface of the web is sealed so as to resist penetration of water or moisture in the atmosphere and this also aids in preventing blistering. It is also important that the coating asphalt of higher softening point is caused to penetrate to substantial depth in the web and thus key it to the web so as to prevent the soft asphalt at the core from bleeding to the surface of the web in hot weather and forming a layer of soft material overlying the surface thereof which permits the surfacing materials to slide relatively to the web. Thus according to the process of this invention a roofing can be made which is so completely filled and sealed as to be non-blistering, which is long lasting and non-brittle due to the relatively soft saturant at the core, and which is non-sliding due to the keying of the coating asphalt to the web. This constitutes a decided advance in the art which is accomplished by a relatively simple and economical process.

A further feature of this invention resides in first impregnating the web with saturant and, then, after removing excess saturant from the surface of the web, immersing the web in bituminous coating material maintained at a higher temperature than that of the saturant. This treatment aids in devoiding the web as the more highly heated coating material causes entrapped air retained in the web to expand and causes the saturant in the web to expand, thus tending to promote expulsion of the air from the web. A further feature resides in immersing the web containing saturant in the bath of coating material before the web has had an opportunity to cool substantially after treatment with the saturant and removal of excess saturant. This prevents air from being sucked into the web due to cooling and contracting of the saturant in the web between the saturation step and the step in which coating material is applied to the web.

A further feature of this invention resides in immersing a web impregnated with bituminous saturant in a bath of bituminous coating material and then, after removing the web from the coating bath and removing excess coating material, applying to a surface of the filled and sealed web an additional layer of coating material which completes the seal and presents a weather resisting layer of bituminous coating material of desired thickness. Another feature of this invention resides in applying the second layer of coating material while the web including the first coating is still hot and before it has had an opportunity of becoming cooled substantially.

Further features of this invention reside in expelling air from a web of material by means of pressure while the web of material is submerged in a bath of coating material and then removing the foam produced in the coating material by the expelled air without substantially contacting the foam with the web after the pressure upon the web has been relieved.

One feature of apparatus embodying this invention resides in the combination of means for saturating a web of material with a bituminous saturant, means for removing excess saturant, means such as squeeze rolls for compressing the impregnated web to devoid the same, and means for coating the impregnated web with coating material while it is devoided. Preferably the means for impregnating the web with saturant and removing excess saturant is combined with means for immersing the web in a tank containing coating material and with squeeze rolls adapted to compress the web below the surface of the coating material in said tank and then relieve the pressure on the web so that the web may expand while still submerged below the coating material and absorb coating material while in a devoided condition.

Further purposes, features and advantages of this invention will become apparent in the following description of an illustrative embodiment of this invention in connection with the accompanying drawings, wherein:

Fig. 1 is a schematic view of part of apparatus for making roofing including saturating and coating means, etc.

Fig. 1—a is a schematic view of a continuation of the apparatus of Fig. 1 including means for applying granules, dusting, cooling, pressing, etc.

Fig. 2 is a side view partly in section showing a coating bath embodying this invention, including squeeze rolls, rollers, doctor blades, etc.

Fig. 3 is a schematic view of a modified form of coating bath;

Fig. 4 is a sectional view of a roofing embodying this invention, and

Fig. 5 is a sectional view of a modified form of roofing embodying this invention.

In the drawings, the reference character 11 indicates a roll of felt or other web, which is mounted upon suitable bearings (not shown) and which is adapted to be unwound by the withdrawal of a web 12 therefrom, the web pasing first over idling rollers 13.

When a first roll of felt has become exhausted, the end of the felt from exhausted roll 11 can be attached to the end of a new roll of felt 11a. In order that the progress of the web 12 may be stopped for a sufficient length of time to permit the attachment of an end portion of the exhausted roll to a new roll of web material while not interrupting the progress of the web through the saturating means, a device for taking up slack and permitting the gradual withdrawal of said slack is afforded by stationary rollers 14 and vertically movable rollers 14' which latter are adapted by suitable means (not shown) to be elevated and lowered as desired. In the normal operation of the machine, the rollers 14' are in the position shown in solid lines. As a roll of web material becomes exhausted, the rollers 14' can be elevated to the position indicated in dotted lines. After a roll of web material has become exhausted and while the end of the web is being attached to a new roll of web material, the rollers 14' are gradually lowered so that the slack material carried thereon can be continuously fed into the rest of the apparatus. After the web has been joined to the new roll, the web from the new roll is fed through the apparatus while the rollers 14' are in the position shown in solid lines. Any suitable number of stationary rollers 14 and movable rollers 14' may be employed.

While it is not essential to the practice of this invention, the web material is preferably passed over any suitable number of drying rolls 15 which may be heated as with steam. The purpose of the drying rollers is to remove any moisture absorbed by the web from the air or elsewhere prior to the saturating step to be described.

The web of material is immersed in a bath of bituminous saturant by passing the same alternately over rollers 16 above the surface of the saturant 17 in saturating tank 18 and over rollers 19 which are submerged below the surface of the saturant 17. Any desired number of rollers 16 and 19 may be employed to the end that the web by passing over the rollers is thoroughly saturated with the bituminous saturant. After leaving the saturating tank 18, the web material is passed through rolls 20 which serve as removing means for removing from the surface of the web material any excess of saturant adhering thereto.

The web material impregnated with saturant is taken to the coating apparatus by means of rollers 21 between which the web of material is allowed to fall in a loop 22, so as to allow for different speeds of operation in passing the web material through the saturating tank on one hand and the coating operation on the other.

In the coating mechanism, the web material impregnated with saturant is immersed below the surface of the melted bituminous coating material 23 in coating tank 24 by means of the roller 25. While the web material is beneath the surface of the coating material 23 it is passed between squeeze rolls 26. The web material after emerging from the squeeze rolls 26 is carried beneath the surface of the coating material and passes under roller 27 and over roller 28 between which doctor blades 29 and 29' are mounted above the surface of the bath for removing excess coating material from the surface of the web. The tank 24 is shown broken at 86 to indicate that the tank may be made of sufficient length to permit the web to fully expand after it is relieved of compression by rolls 26.

In order to afford a layer of coating material of sufficient thickness on a surface of the web, the web material which has been filled and sealed by the apparatus above described, may be passed in operative relation with respect to means for applying coating material to the desired surface. For example, coating material may be applied to the surface of the web by means of pipe 30 and the excess coating material thus applied may be spread to desired thickness by means of spreader rolls 31.

In carrying out the process or method with the above apparatus, the web has been filled with saturant material and sealed with coating material while devoided of air. Moreover, a layer of coating material has been applied to one surface of the web to desired thickness. The web so filled, sealed and coated may now be passed about drum 33. A granular material such as slate granules is fed upon the coated surface of the web from a hopper 34. In passing from drum 33 to drum 35, the web of material is inverted and a coating of fine material such as fine mica flakes is applied to the reverse side of the web from hopper 36. Thus the roofing is coated by suitable application means with finely divided solid material, the type of solid material being regulated on either side as desired. Pressure may be applied to the web by suitable rolls 32 to properly imbed the granular material in the coating.

The web of roofing material is cooled by passing the same over any suitable number of drums 37 which may be cooled by means of water, for example. The roofing may then be compressed to final form by means of press rollers 39.

If the roofing is to be marketed in roll form, the roofing may be taken from press rolls 39 and wound in rolls in any suitable manner (not shown).

If the roofing material is to be cut into shingles, it is preferably festooned on a plurality of traveling slackholding bars 40 which carry a relatively large amount of slack material. The roofing material is taken from the slack holding bars 40 over guide rollers 41 to a device for cutting the roofing longitudinally which is indicated generally by the reference character 42 and to a device for cutting the longitudinal strips into suitable lengths which is indicated generally by the reference character 43. Thus any suitable form of and shape of shingles or shingle strips or squares may be cut from the roofing material. The cut material can be collected and baled in any suitable way for marketing.

Referring to Fig. 2, a coating bath which embodies this invention and may be employed in the practice of this invention is shown in detail for the purpose of illustrating an embodiment of this invention. In the description of this invention in connection with Fig. 1, reference has already been made to rollers 21, 25, 27, and 28 and these reference characters indicate the corresponding parts in Fig. 2. The web of material 12 is passed between squeeze rollers 26 already described in connection with Fig. 1. Preferably, the inlet 44 for supplying the coating tank 24 with fresh bituminous coating material is located adjacent the part of the tank 24 which is on the side of the squeeze rollers 26 at which the web material is discharged after compression by said rollers. Moreover, the outlet 45 for the tank is preferably on the side of the squeeze rollers 26 on which the web of material 12 is taken between the squeeze rolls. It is a feature of this invention that the flow of bituminous coating material in tank 24 is controlled so that the bubbles formed by air expelled from the web 12 by passing the web between squeeze rollers 26 are carried away from the squeeze rollers and are not permitted to mingle with the coating material on the side of the squeeze rolls at which the web is withdrawn. Thus, the re-absorption of air into the web is prevented.

In the process or method for carrying out this invention, means are preferably employed for regulating the amount of pressure exerted upon a web of material passing between squeeze rolls 26. In Fig. 2, such means are shown as comprising a hand wheel 46 which operates through beveled gears 47 to turn threaded rods 48 for the elevation and lowering of bearing blocks 49 in which one of the squeeze rolls is mounted. By the means just described, the squeeze rolls may be moved so as to become more adjacent to or more remote from each other as desired in regulating the pressure exerted upon a web of material passing between the squeeze rolls but any other suitable arrangement for regulating the pressure of the squeeze rolls on the web may be used. Preferably, the rollers 25 and 27 are adjustable so as to control the travel of the web 12 through the coating bath contained in the tank 24. The adjusing means is shown in the form of hand wheels 50 and 51 which operate in any suitable manner to elevate and lower rollers 26 and 27 respectively. Means are afforded for regulating the position of doctor blades 29 and 29' with reference to the web material 12 passing between guide rollers 27 and 28. The position of the doctor blade 29 is regulated by hand wheel 52 which acts through worms 53 and worm wheels 54 and threaded rods 55 to move the doctor blade 29. The position of doctor blade 29' is regulated by the corresponding parts 52', 53', 54', and 55'.

A modified form of coating bath is shown in Fig. 3. Bituminous coating material 56 is contained in a tank 57. Fresh coating material is charged into tank 57 through inlet 58 and excess coating material is withdrawn through outlet 59. A web of material 12 passes into the tank over a roller 60 and is submerged in the coating material 56 by means of a submerged roller 61. The web of material is shown in Fig. 3 as passing between squeeze rolls 62 and 63. The purpose of the second squeeze rollers 63 is to complete the devoiding of the web in case the web is not completely devoided by squeeze rollers 62. Any plurality of squeeze rollers may be employed in the coating bath to devoid the web.

To further assist in devoiding the web of air, the travel of the web through the tank may be increased and regulated by guide rollers 64 and 65. Thus, if desired, the immersion of the web in the bituminous coating material may be prolonged and the web may be flexed, thus assisting in the devoiding of the web. If desired, a guide roller 66 may be provided above the surface of the coating in the coating tank so that the temperature of the web 12 passing therethrough may be prevented from rising to an excessively high degree. In such case, the web of material can be taken to squeeze rollers 62 over roller 67. Means may be afforded for adjusting the position of any of the rollers 64, 65, 66, and 67 as desired.

It is one of the features of this invention that a web of material is saturated with a bituminous saturant, any excess saturant being removed from the surface thereof, and is immediately thereafter immersed while hot in a tank of coating material. Apparatus for performing such an operation is shown in Fig. 3, wherein a tank 68 of saturant 69 is shown from which the web of material is taken over guide rollers 70 after having been taken past doctor blades 38 to remove excess saturant. The web of material is then taken to guide roller 60 and is immediately immersed in the coating material in tank 57, reducing the travel between doctor blades 38 and the point of immersion into the coating material to a minimum. For example, the distance between the doctor blades 38 and the point at which the web is immersed in bituminous coating material contained in tank 57 may be reduced to 3 or 4 feet. Moreover, the rate of movement of the web as it is passed progressively through the apparatus is preferably such that the web will pass from the doctor blades 38 to coating material in tank 57 in the shortest possible time. While this feature of this invention has been described in connection with particular apparatus, it is to be understood that the method step involving the control of rate of web movement and distance of web travel between the saturating and the coating operations so that the web will only have a few seconds to cool may be practiced with any type of apparatus. In other words, the web is passed to the coating bath before it has had time to cool substantially.

A further feature of this invention is also shown in Fig. 3 and resides in applying coating material to a web of material immediately after the web of material has been removed from a bath of bituminous coating material. Thus, in Fig. 3, the web of material is taken from the bath after having passed over roller 72 and is passed directly over guide roller 85 and to doctor blades 73 in front of which coating material is applied from pipe 74. Prior to the application of coating from pipe 74, the web is preferably passed over doctor blades 75 and 76 to remove excess coating adhering to the web upon its removal from the coating bath. The doctor blades 73 can be placed over the tank 57 when the coating material applied from pipe 74 is similar in character to the coating material admitted into the tank through inlet 58.

In cases where a special superficial coating is desired, such as a coating mineralized with fine inorganic materials and the superficial coating is to be different from the sealing coating applied by immersion of the web in a bath of the coating material, the coating doctor blades or spreading rollers are not positioned over the tank of coating material, but are positioned to one side thereof as shown in Fig. 1.

Preferably the second superficial coating of coating material is applied to the web as soon as possible after the web has been removed from the coating material and before the web has had an opportunity of becoming substantially cooled. For example, it is preferable to arrange the rate of movement of the web and the distance of travel between the coating bath and the point of application of the second coating of coating material so that the time for the web to cool will be reduced to not more than a few seconds and the web will not have had an opportunity of becoming substantially cooled.

In Fig. 1, excess coating material applied by pipe 30 is collected in a special receptacle 77. In Fig. 3 the excess coating material is collected in a suitable member of tank 57.

While the operation of the above apparatus is apparent it will be briefly described as follows:

A web of material 12 is unrolled from either of the rolls 11 or 11a and is passed progressively through a saturating tank 18 where it is impregnated as thoroughly as possible with bituminous saturant. The thoroughly impregnated web is taken from the saturating tank to rolls or doctor blades which remove excess saturant from the surface of the web. Preferably, after leaving the rolls only small amounts of saturant remain unabsorbed by the web material. It has been found in practice that it is desirable to have the web come from the rolls in a "spotted" condition, namely, having certain areas of the web appearing wet and certain areas of the web appearing dry. If too great amounts of saturating material are left adhering to the surface of the web, this material acts as a lubricant for higher melting point coating material applied thereto with the result that the finished product has a tendency to slide. If the saturated felt is made too "dry", it is difficult to remove all the air from the felt prior to the coating and sealing of the felt.

The web is preferably in the practice of this invention immersed in the bath of coating material as quickly as possible so as to avoid the adsorption of air by the web which would otherwise occur due to the cooling of the web and to the expansion of the web after having passed from the rollers or doctor blades. Preferably, though it is not essential to the practice of this invention, the web is not permitted to cool substantially, e. g. more than a few degrees, in passing from the saturating bath to the coating bath. The immersion of the web in hot coating material partially devoids the web. While the web of material is immersed in the bath of coating material, it is pressed by squeeze rollers preferably to a definitely greater extent than that resulting from the pressure of the rolls or other saturant removing means at the conclusion of the saturating bath. As the web passes between the squeeze rolls beneath the surface of the coating bath a foam of bubbles occurs in the coating material. This foam is preferably withdrawn from the tank and the occurrence of the foam in the bath at a point at which it could contact with the web after the web has passed from the squeeze rolls is avoided. The web, after having passed from the squeeze rolls in the coating bath expands and sucks in the coating material to replace the air that has been expelled from the web. The web is thus not only filled with saturant but also is sealed with coating material which permeates the web surface layer and keeps the web in a permanently devoided condition. It is to be noted that the web is maintained devoided during the coating operation. After leaving the coating bath, excess coating material can be removed as by doctor blades. After the web has been filled with bituminous saturant and sealed with bituminous coating material as above described, the web can be used without coating the material further. For example, the filled and sealed web can be used as a flooring or for the construction of multi-ply "built up" roofing or for pipeline covering. For roofing purposes, however, it is preferable to apply a second layer of coating material to give increased resistance to weathering and to afford a layer of sufficient thickness to hold adherently a finely divided, e. g., granular solid material such as slate granules of suitable color. It is preferable to apply the second coating before the cooling of the web can cause air to be sucked into the web. Additional coatings with bituminous material can be applied if desired but ordinarily are not necessary. The web, after it has been coated on the front and back with suitable granular or pulverulent materials and cooled, may be marketed in the form of roll roofing or as cut into suitable shapes and sizes.

In carrying out the process above described, it is desirable to devoid the web of material as much as possible prior to coating the same with coating material in a devoided condition. In usual practice the amount of voids in the ultimate product can be reduced to such a point that blistering of the roofing when subjected to weathering is substantially avoided. Thus the roofing is rendered substantially free of voids and is permanently sealed in such a condition. The degree of devoiding can be increased by subjecting the web to more than one compression to drive out air contained in the felt, by prolonging the coating application and the like. The method of manufacture above described has been found, however, to devoid the web sufficiently completely and to seal the web in a devoided condition without burning the web by too long immersion in coating material heated to a relatively high temperature.

The saturating material is preferably a relatively low softening point asphalt. The lower softening point asphalts are more resistant to weathering and are more flexible. Moreover, in melting them sufficiently to permit a web to be impregnated therewith, they do not have to be heated to temperatures which are so high that burning and weakening of the web occurs during the time that is required to impregnate a dry web. Preferably, a saturant is used which has a softening point of 95° F. to 140° F. as determined by the ball and ring method and which has a penetration of about 10 to 130 at 77° F. as determined with a Dow penetrometer. Considerable latitude below and above the preferred figures above given, e. g., the use of materials having a softening point of about 75° F. to about 200° F. with a penetration of about 5 to 200 at 77° F. is permissible, having in mind that if a bituminous saturant having too low a softening point is used, the product will be too soft and too flexible and that if a saturating material having too high softening point is used there is likelihood of burning the web during the saturating step and of producing a product which is too rigid and subject to excessive cracking when flexed and of reduced resistance to weathering.

The saturating asphalt is preferably applied at a temperature of about 350° F. to 400° F. although the temperatures named are not regarded as critical.

The bituminous coating material has a softening point which is preferably between about 220° F. and about 250° F. and has a penetration of about 9 to about 20 at 77° F. However, satisfactory results can be obtained when the softening point ranges from about 190° F. to about 275° F. and the penetration ranges from about 50 to about 5 at 77° F. The coating material is preferably applied at about 425° F. although about 50° to 75° F. variation from this figure will still afford satisfactory results. When a second coating is applied, the web is preferably not permitted to cool more than a few degrees before it is applied.

The softening point and penetration of the coating material (and saturant) that is used depends somewhat on the climate in which the roofing material is to be used. The bituminous saturating and coating materials are preferably used in a condition which is as free of air bubbles as possible.

One embodiment of a roofing made in accordance with this invention is shown in Fig. 4. The roofing comprises a web 78 of material such as felt. The web material is impregnated with a saturant 79. A sealing coat of bituminous coating material is indicated by the reference character 80. The sealing coating preferably has a higher softening point than the softening point of the saturant 79. Preferably, also the sealing coat 80 impregnates the web 78 adjacent the surfaces thereof so that the web 78 is impregnated at one portion thereof with a bituminous saturant and is impregnated in another portion thereof and adjacent the surfaces thereof with a coating material of higher softening point than said saturant. Thus there is an inner layer of felt impregnated with a saturant and two overlying layers of felt impregnated with a coating material having a higher softening point than said saturant, and the felts in the layers are interfelted with each other. At one side of the roofing, a thin surfacing 81 of pulverulent material such as fine mica flakes may be applied. At the opposite surface of the roofing, the surface coating or layer 82 of bituminous coating material is applied and overlies layer 80 and the felt in layer 80.

In Fig. 4, the bituminous material in layers 80 and 82 are substantially identical and become merged with one another so that a coating material is afforded comprising bituminous coating material which impregnates the felt and is keyed thereto and a surface layer 82 which overlies the felt and which has substantial thickness and weather-resistance. Adherent to the layer 82, a surfacing 83 of granular or finely divided solid material may be applied of any suitable size or color. The surfacing 83 may consist of granular solid particles of suitable colored slate, for example.

A modified embodiment of this invention is shown in Fig. 5. The structure in Fig. 5 is identical with that of Fig. 4 except that in place of the layer 82 shown in Fig. 4 a layer 84 is employed of a coating material which is substantially different from the coating material contained in layer 80. Thus, for example, a coating material having a different softening point from the melting point of the coating material contained in layer 80 may be employed. Moreover, the coating material in layer 84 may comprise a finely divided inorganic solid material in certain cases as desired.

As above stated, it is preferable too that the roofing contain less than about 2.0% of voids. Moreover, it is also preferable that the total weight of material overlying the felt base of the roofing and including the bituminous coating material and finely divided solid surfacing material be less than about 45 pounds per 100 sq. ft. so as to minimize a tendency of overlying material to slide.

The new product of this invention may also be manufactured without layer 82 or layer 83, for example, to be used as the felt in built-up roofing construction. Moreover, a variety of superficial coatings of dust or granular materials, or liquids such as paint and the like, may be applied for protective or ornamental purposes, or both.

While this invention has been described in connection with certain specific illustration it is to be understood that this has been done for the purpose of illustration and that this invention is not to be limited thereby. Moreover, it is also to be understood that the term "roofing" includes roll and shingle roofing, siding strips, and other building materials of the character described.

We claim:

1. A method of making roofing which comprises immersing a web of material impregnated with a saturant in a bath of melted coating material, expelling air from said felt by means of pressure applied by progressively squeezing said web while said web is submerged in melted coating material, thereby producing a foam of bubbles in said melted coating material, releasing the pressure on the said web while said web is submerged in said bath of coating material, and maintaining an inflow and outflow of melted coating material to and from said bath so that said foam of bubbles is withdrawn from said bath without being contacted in substantial amount with said web after release of pressure on said web.

2. A method of impregnating and coating a web with bituminous material which comprises impregnating a web of material with heated and melted bituminous saturant, removing excess saturant from said web, immersing said impregnated web in a bath of heated and melted coating material having a higher melting point than the melting point of said saturant before said impregnated web has cooled substantially, squeezing said web while submerged in said coating material and relieving said squeezing pressure while said web is submerged in said coating material so as to impregnate the layers of said felt adjacent the surface thereof with said coating material, and removing said web from said bath of coating material with coating material adhering to said web.

3. A method of making roofing which comprises impregnating a web with a bituminous saturant by applying said saturant in a melted condition to said web, then devoiding of entrapped air said web impregnated with said saturant by compressing said web by means of pressure which is applied to said web by squeezing said web, removing the pressure from said web while said web is submerged in and is in contact with a bath of bituminous coating material which has a substantially higher softening point than said saturant and which is in a heated and melted condition so that said web as thus devoided is coated with said coating material, and removing said web from said bath of coating material with said coating material adhering to said web and sealing said web against recurrence of voids expressed from said web in said devoiding step.

4. A method of impregnating and coating a web with bituminous material which comprises impregnating a web with bituminous saturant by contacting a surface of said web with heated and liquefied saturant, removing the impregnated web from contact with said saturant, then subjecting said web to pressure applied by progressively squeezing said web to substantially reduced thickness thereby expelling from said web a substantial amount of entrapped air, and thereafter, as said web is removed from the squeezing step, contacting the surface thereof with a bituminous coating material which has a higher melting point than the melting point of said saturant and which is in a heated and liquefied condition, thereby permitting said web to expand while contacted with said bituminous coating material so as to draw said bituminous coating material into said web.

5. A method of making roofing which comprises passing a web through a bath of liquefied bituminous saturant, taking the web from said bath, removing excess saturant from said web, then immersing said impregnated web in a bath of liquefied bituminous coating material having a higher melting point than the melting point of said saturant, subjecting said web, while said web is submerged in said bath of coating material, to pressure applied by progressively squeezing same so as to devoid said web until less than 2% of voids are retained in said web, maintaining said web submerged in said bath of coating material as the pressure applied during the squeezing step is relieved and for a substantial length of time after it has been removed from said squeezing step, and thereafter taking said web from said bath of coating material.

6. A method of making roofing which comprises impregnating a web with bituminous saturant by contacting the web with a bath of liquefied saturant, taking the web from said bath of liquefied saturant, removing excess saturant from said web, then immersing said web in a bath of liquefied bituminous coating material having a higher melting point than the melting point of said saturant, subjecting said web to progressively applied squeezing to compress and devoid same until the void content is reduced to at most about 0.5% while said web is submerged in said coating material, maintaining said web submerged in said coating material as the pressure imposed on said web during the squeezing step is relieved and for sufficient length of time thereafter to permit said web to substantially fully expand after having been compressed during the squeezing step, and then taking said web from said bath of coating material.

7. A method of making roofing which comprises impregnating a web with a bituminous saturant by applying said saturant in a melted condition to said web, removing excess saturant from the surfaces of said web, then submerging the web in a bath of melted coating material having a softening point higher than the softening point of said saturant and maintained at a temperature substantially higher than the temperature at which said saturant is applied to said web, compressing said web by means of pressure which is applied to said web by squeezing said web to substantially reduced thickness while said web is submerged in said coating material, relieving the pressure from said web while said web is submerged in said coating material and is in contact therewith so that said web is permitted to expand while in contact with said coating material after having been compressed by said squeezing and to draw said coating material into said web, and removing said web from said bath with the coating material adhering thereto.

8. A method of making roofing which comprises impregnating a felt web with a bituminous saturant by applying melted saturant to said web, removing excess saturant from the surface of said web, immersing said web in a bath of melted coating material having a softening point higher than said saturant, devoiding said web by means of pressure which is applied to said web by squeezing said web to substantially reduced thickness, relieving said web of pressure while said web is immersed in said bath of coating material and is in contact therewith, removing said web from said bath of coating material, applying a second coating of coating material having a higher softening point than said saturant to said first coating while said web is not submerged in said bath of coating material and before said web has had an opportunity to cool substantially after having been removed from said bath of coating material, and spreading said second coating material to desired thickness.

9. A method of making roofing which comprises impregnating a web with a bituminous saturant by applying saturant in a melted condition thereto, removing excess saturant from the web by means of pressure applied thereto by squeezing, immersing the web in a bath of coating material having a softening point higher than that of the saturant, devoiding the web by means of pressure applied to said web, said devoiding pressure being applied by squeezing said web, being substantially greater than said pressure employed in removing excess saturant from said web and being adapted to compress said web to substantially reduced thickness, releasing the pressure on said web while said web is immersed in said coating material so that said web is permitted to substantially fully expand while it is in contact with said coating material and thereby draw said coating material into said web, and removing said web from said bath of coating material with coating material adhering thereto.

10. A method of making roofing which comprises passing a web through a bath of liquefied bituminous saturant, taking the web from said bath, removing excess saturant from said web, then immersing said impregnated web in a bath of liquefied bituminous coating material having a higher melting point than the melting point of said saturant promptly and before said impregnated web has cooled substantially, subjecting said web to pressure by progressively squeezing same to devoid said web while said web is submerged in said bath of coating material, maintaining said web submerged in said bath of coating material as the pressure imposed in said squeezing step is relieved and for a substantial length of time after it has been removed from said squeezing step, and thereafter taking said web from said bath of coating material.

HAROLD W. GREIDER.
GEORGE ARTHUR FASOLD.